United States Patent [19]

Jensen

[11] Patent Number: 4,543,095
[45] Date of Patent: Sep. 24, 1985

[54] VISUAL FLOW INDICATOR

[75] Inventor: Ole R. Jensen, River Vale, N.J.

[73] Assignee: E. R. Squibb & Sons, Inc., Princeton, N.J.

[21] Appl. No.: 542,139

[22] Filed: Oct. 14, 1983

[51] Int. Cl.⁴ ............................................. A61M 5/00
[52] U.S. Cl. ................................... 604/246; 604/318; 73/861.88; 128/726
[58] Field of Search ............................. 604/246, 318; 73/861.87, 861.88; 128/726

[56] References Cited

U.S. PATENT DOCUMENTS

| | | | |
|---|---|---|---|
| 2,037,278 | 4/1936 | Siber | 73/861.88 |
| 4,187,847 | 2/1980 | Loeser | 604/246 X |
| 4,461,174 | 7/1984 | Han | 73/861.88 |

Primary Examiner—Dalton L. Truluck
Attorney, Agent, or Firm—James & Franklin

[57] ABSTRACT

The indicator includes a transparent hollow cylindrical chamber with co-linearly aligned inlet and outlet ports located at spaced points along the cylindrical wall, on opposite sides thereof. An element is freely rotatably mounted within the chamber. The element includes an axle and a plurality of blade-like projections radially extending from the axle towards the cylindrical wall. End portions of the axle extend laterally beyond the plane of the projections and are received in recesses in the circular chamber walls which are aligned with each other and the axis of the chamber. The indicator is particularly useful in low flow rate situations such as in conjunction with stoma or wound irrigation devices.

7 Claims, 4 Drawing Figures

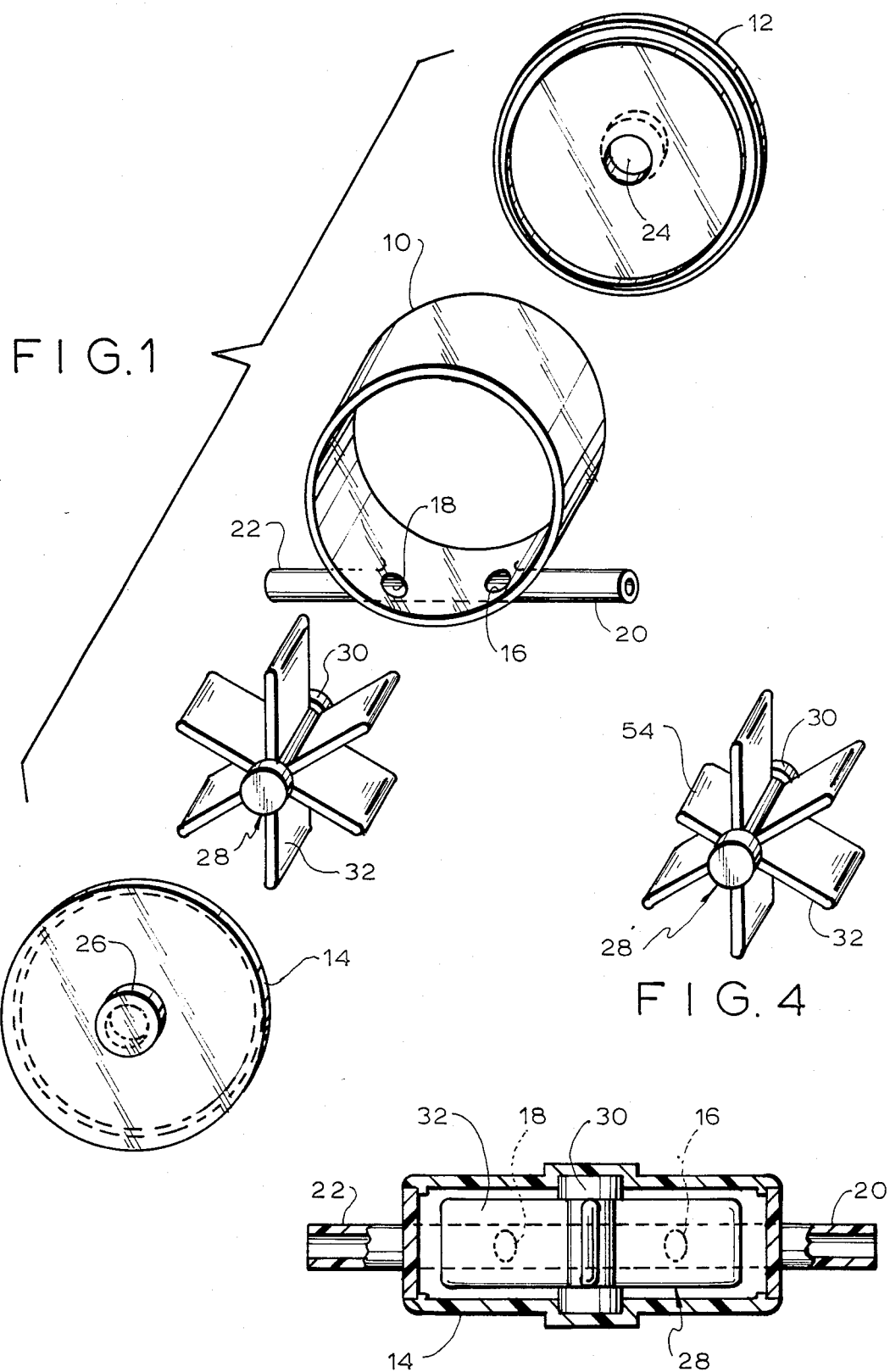

VISUAL FLOW INDICATOR

The present invention relates to fluid flow indicators and, more particularly, to an apparatus for visually indicating the direction and rate of flow of a relatively low flow rate fluid.

Fluid flow rate indicators and meters of various structures have been known and used for a variety of different applications. Many known fluid flow rate indicators and meters are relatively complex in design, expensive to manufacture, and do not operate effectively in very low rate of flow situations. There are, however, situations where a simple inexpensive device is required to indicate the direction and rate of flow of the relatively slowly moving fluid. One such application is in the medical field and, in particular, in devices used for wound or stoma irrigation.

In a surgical procedure commonly called a colostomy, removal of a section of the bowel and the rectum is performed. In such cases, an artificial rectal opening or stoma is formed to permit waste products to be removed.

Since the stoma does not have a sphincter muscle, a colostomy patient cannot control the opening and closing of the stoma and, thus, the discharge of waste from the intestine. In order to avoid involuntary bowel movement through the stoma, it is often desirable for the patient to periodically irrigate the bowel by taking an enema through the stoma.

In general, the irrigation system consists of a water reservoir and a means for suspending the reservoir at about shoulder level to supply gravity flow of the water through a tube leading from the reservoir to the stoma. A plastic sleeve is adapted to be attached to the patient by, for instance, a supporting belt. An opening at or near the upper end of the sleeve encircles the stoma of the patient. A sealing member associated with the opening forms a fluid-tight seal with the abdominal wall of the patient to protect the patient from spilling or soiling during the irrigation operation. The lower end of the sleeve is open for discharge of the irrigating fluid and waste into a toilet or other receptacle. Provision is made at the upper end of the sleeve for ducting the irrigating fluid through the sleeve and into the stoma. In addition, a flow control valve is usually interposed between the reservoir and the plastic sleeve to permit the user to regulate the flow of water into the sleeve.

In different situations, external irrigation of wounds is sometimes required. In such situations, a hollow plastic chamber, preferably flexible in nature, is affixed to the skin of the patient surrounding the wound. Water or other fluid is then fed from the reservoir through the chamber such that it bathes and cleanses the wound externally. Again, a valve may be used to regulate the rate of flow of fluid through the chamber.

In both of the above instances, it is important to regulate the rate of flow of fluid so as to prevent excess or increased fluid pressure from damaging sensitive tissue. In addition, it is necessary that the direction of flow from the reservoir to the wound be monitored to prevent fluid from moving from the wound back into the reservoir, thereby contaminating the fluid in the reservoir.

The apparatus utilized in wound or stoma irrigation is relatively inexpensive and usually includes bags, tubing, connectors, and the like made of plastic. Such apparatus is designed for low pressure applications in which the fluid flow rate is relatively slow. It is therefore necessary that a flow rate indicator designed for use in conjunction with such apparatus be relatively simple and inexpensive and, in particular, operate reliably in low flow rate situations. For these reasons, electrical flow meters or complex mechanical flow rate indicators are not suitable for such applications. Such indicators often do not function appropriately in low flow rate situations and may create substantial resistance to the flow of fluid.

For this reason, irrigation devices heretofore employed have visual flow rate indicators which depend upon the movement of a bead or small plastic ball to indicate flow direction and rate. Such indicators normally include an annular or doughnut-shaped hollow plastic chamber with inlet and outlet ports on opposite sides thereof. The bead or ball is situated within the chamber and freely movable therein. Sufficient flow of fluid through the chamber will cause the bead or ball to move in a manner which indicates the direction of fluid flow. The chamber is normally made of transparent plastic such that the movement of the bead can be observed.

Such bead-type flow indicators are simple in design and inexpensive to manufacture. However, these devices do not operate properly in very low flow rate situations and it has been found that there is a "dead point" where the bead may remain stationary even when fluid is flowing through the indicator such that a misleading reading may result.

It is, therefore, a prime object of the present invention to provide a visual flow indicator which is simple in design, inexpensive to manufacture and which gives an accurate visual indication of both fluid flow direction and rate.

It is another object of the present invention to provide a visual flow indicator which will operate properly even in relatively low flow rate situations.

It is another object of the present invention to provide a visual flow indicator usable in conjunction with medical apparatus such as irrigation devices.

It is another object of the present invention to provide a visual flow indicator composed of a small number of relatively simple parts which cooperate together reliably and have an extended useful life.

In accordance with one aspect of the present invention, apparatus for visually indicating the direction and rate of flow of a fluid is provided. The apparatus includes a hollow chamber having an axis. The chamber includes first and second spaced substantially circular walls and a substantially cylindrical wall. Colinearly aligned inlet and outlet ports are located at tangentially spaced points along the cylindrical wall of the chamber on opposite sides thereof. An element is freely rotatably mounted within the chamber. The element comprises an axle and a plurality of blade-like projections. Preferably, four or more blade-like projections are provided; and most preferably, six blade-like projections. The projections radially extend from the axle towards the cylindrical wall. The axle comprises end portions extending laterally beyond the plane of the projections at either side thereof. Each of the circular walls includes a recess in the interior surface thereof. The recesses are aligned with each other and with the axis of the chamber. The recesses are adapted to accept the laterally extending end portions of the axle so as to permit the element to freely rotate about the axis of the chamber. The chamber also includes a substantially transparent portion to permit observation of the movement of the element as fluid flows from the inlet port to the outlet port.

In accordance with another aspect of the present invention, apparatus for irrigating a wound is provided. The apparatus includes a fluid source, a flow control valve and means adapted to be situated proximate the wound for imparting fluid thereto. The fluid imparting means has inlet means and outlet means to permit the flow of fluid therethrough. Means are provided for connecting the source, through the valve to the inlet means. The connecting means includes means for visually indicating the direction and rate of flow of the fluid through the connecting means. The indicating means comprises a hollow chamber having an axis. The chamber includes first and second spaced substantially circular walls and a substantially cylindrical wall. Colinearly aligned inlet and outlet ports are located at tangentially spaced points along the cylindrical wall of the chamber, on opposite sides thereof. An element is provided as are means for freely rotatably mounting the element within the chamber. The element includes an axle and a plurality of blade-like projections radially extending from the axle towards the cylindrical wall. The chamber also includes a substantially transparent portion to permit observation of the movement of the fluid as fluid flows from the inlet port to the outlet port.

The mounting means includes end portions of the axle which extend laterally beyond the plane of the projections, at either side thereof. Recesses formed in each of the circular walls are aligned with each other and with the axis. The recesses are adapted to accept the laterally extending end portions of the axles so as to permit the element to freely rotate within the chamber.

To these and such other objects which may hereinafter appear the present invention relates to a visual flow indicator, as described in the following specification and recited in the annexed claims, taken together with the accompanying drawings wherein like numerals refer to like parts, and in which:

FIG. 1 is an exploded isometric view of the visual flow indicator of the present invention;

FIG. 2 is a cross-sectional view of the visual flow indicator of the present invention taken along a horizontal line passing above the axis of the device;

FIG. 4 is an isometric view of a second preferred embodiment of the rotatably mounted element of the present invention.

Figure 3:
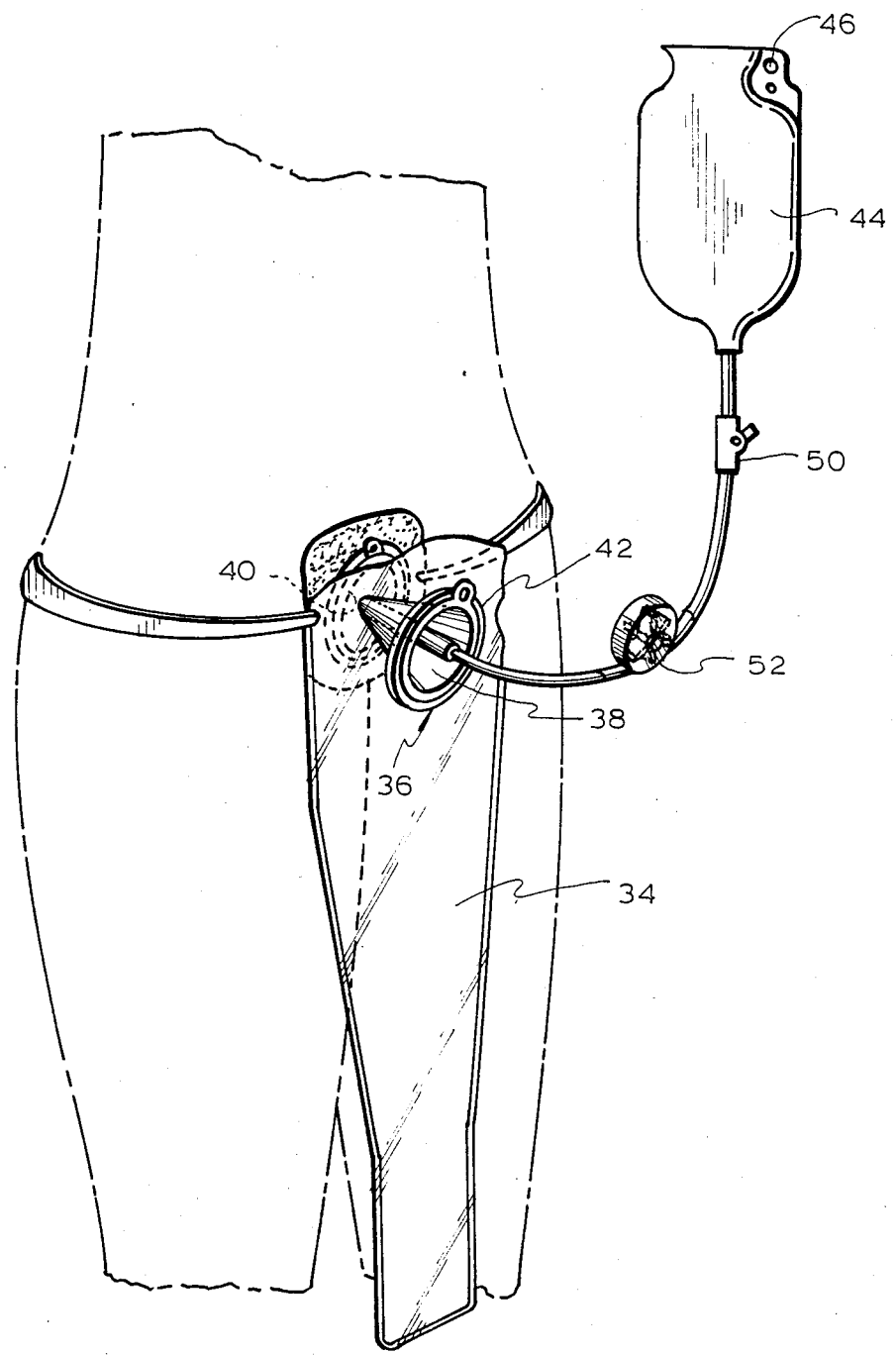
FIG. 3 depicts a medical irrigation device which incorporates the visual flow indicator of the present invention.

As seen in FIGS. 1 and 2, the visual flow indicator of the present invention includes a substantially cylindrical hollow enclosure or chamber formed of a substantially cylindrical open-ended part 10, a substantially circular rear wall 12, and a substantially circular front wall 14. Part 10 and walls 12 and 14 are preferably made of transparent, relatively rigid plastic material. Walls 12 and 14 are affixed to the open sides of part 10 in a fluid-tight manner such as by adhesive or the like. Alternatively, rear wall 12 may be formed integral with part 10.

The cylindrical wall of part 10 is provided with an inlet port 16 and an outlet port 18. Ports 16 and 18 are colinearly aligned and located at tangentially spaced points along the cylindrical wall of part 10 on opposite sides thereof. Accordingly, fluid flowing through inlet port 16 will pass through the hollow interior of the chamber and, thereafter, exit the chamber through outlet port 18.

Each of the ports 16 and 18 are preferably provided with an outwardly extending sleeve 20, 22, respectively, to facilitate the connection of the indicator to plastic tubing. Sleeves 20 and 22 have an outer diameter approximately equal to the inner diameter of the plastic tubing such that the ends of the plastic tubing can be frictionally received in a fluid-tight manner over the sleeves 20 and 22.

Each of the circular sides 12 and 14 is substantially planar, except for centrally located outwardly extending hollow projections forming centrally located recesses 24, 26, respectively, in the interior surfaces thereof. Recesses 24 and 26 in side walls 12 and 14 are aligned with each other and with the axis of the chamber.

Situated within the chamber is a freely rotatably mounted element 28. Element 28 includes a substantially cylindrical axle 30 and six blade-like projections 32. Projections 32 extend radially from axle 30 towards the interior surface of the cylindrical wall of part 10.

As is best seen in FIG. 2, axle 30 has end portions which extend laterally beyond the plane of projections 32, at either side of element 28. The outwardly extending end portions are adapted to be received within recesses 24 and 26 of circular walls 12 and 14, respectively. This structure permits element 28 to rotate freely about the axis of the chamber. The direction of rotation of the element 28 indicates the direction of fluid flow through the chamber. The speed of rotation of element 28 indicates the rate of flow of fluid through the chamber.

It is preferable that element 28 be opaque, and may be composed of a brightly colored material such as plastic or the like. In this manner, observation of the direction and speed of rotation is facilitated.

Element 28, as shown in FIG. 1, has six blade-like projections. This number of projections is preferred as it has been found to be the number of projections which permits optimum functioning of the indicator under all circumstances. However, for certain applications, it has been found that a minimum number of four projections will function acceptably. Accordingly, four or more projections are required.

It will now be appreciated that the visual flow indicator of the present invention has an extremely simple structure and can be manufactured at minimal cost. The simplicity of the design insures that the parts will function reliably together for a long, useful life. It should, however, also be appreciated that the structure of the present invention is a significant improvement over the bead-type visual indicators of the prior art because the present invention will function reliably even in relatively low flow rate situations such as the stoma irrigation device depicted in FIG. 3.

FIG. 3 depicts an irrigation sleeve 34 designed for use by colostomy patients. Sleeve 34 is adapted such that it can be selectively and removably attached to any one of a plurality of different snap-on attachments, such as an irrigation attachment 36 which includes a substantially conical member 38 or a rinsing or flushing attachment of different configuration. Sleeve 34 is basically funnel-shaped so that it may more effectively direct the flow of irrigating fluid and waste material therethrough. The sleeve has an opening 40 adapted to receive a stoma of a colostomy patient and a second opening 42 adapted to receive the conical attachment 38. Opening 42 for attachment 38 can be moved out of alignment with the opening 40 for the stoma in order to inhibit soiling of the attachment 38 by irrigating fluid and waste material discharged from the stoma, without requiring the attachment to be removed from the sleeve.

Conical attachment 38 has a central conduit therethrough which is operably connected to a fluid source such that irrigating fluid can be imparted into the stoma. The fluid source is preferably in the form of a plastic bag 44 having an opening 46 or the like to permit the bag to be hung at shoulder height such that the fluid in the bag is gravity fed through a conduit 48, through a flow control valve 50, through the visual flow indicator 52, and through attachment 38 into the stoma.

The structure of the irrigation apparatus depicted in FIG. 3 is more fully described in European patent application No. 82.304044.9 filed July 30, 1982 in the name of E. R. Squibb & Sons, Inc. That application was published under Number 0072641 A1 on Feb. 23, 1983. The reader is referred to that patent application for further details concerning the structure and function of the irrigation device itself.

It will now be appreciated that the visual flow indicator of the present invention is of simple construction and, thus, inexpensive to manufacture. For this reason, it is particularly suited for use with wound or stoma irrigation devices, such as that depicted in FIG. 3. The indicator permits the patient to easily and quickly ascertain the direction and flow rate of the liquid from the source into the stoma. Accordingly, the patient can insure that the fluid flow rate into the stoma is acceptable and may regulate same easily by simply adjusting valve 40. In addition, by observing the direction of rotation of element 28 within the chamber of the flow rate indicator, contamination of the fluid in the reservoir 44 can be eliminated.

FIG. 4 illustrates a second preferred embodiment of the rotatably mounted element, designated as 28'. Element 28' is similar to element 28, shown in FIG. 1, except that one of the projections or paddles 54 is shorter than the others. With this configuration, a pulsating effect is created as the element rotates. This pulsating effect aids the user in determining the rate and direction of fluid flow.

While only two embodiments of the present invention have been disclosed herein for purposes of illustration, it is obvious that many variations and modifications could be made thereto. It is intended to cover all of these variations and modifications which fall within the scope of the present invention, as defined by the following claims:

I claim:

1. Pulsating apparatus for visually indicating the direction and flow of a fluid comprising a hollow chamber having an axis and comprising first and second spaced, substantially circular walls and a substantially cylindrical wall, colinearly aligned inlet and outlet ports, located at tangentially spaced points along said cylindrical wall of said chamber on opposite sides thereof, an element freely rotatably mounted within said chamber, said element comprising an axle and a plurality of blade-like projections radially extending from said axle towards said cylindrical wall, at least one of said projections being shorter than the others and having a peripheral edge spaced from said cylindrical wall, said axle comprising end portions extending laterally beyond the plane of said projections at either side thereof, each of the circular walls comprising a recess in the interior surface thereof, said recesses being aligned with each other and with the axis of said chamber, said recesses being adapted to accept said laterally extending end portions of said axle so as to permit said element to freely rotate about said axis, wherein said chamber comprises a substantially transparent portion to permit observation of the rotational movement of said element as fluid flows from said inlet port to said outlet port and wherein said rotational movement of said element has a pulsating effect due to the presence of said one shorter projection.

2. The apparatus of claim 1, wherein said axle has four or more blade-like projections radially extending therefrom.

3. The apparatus of claim 2, wherein said axle has six blade-like projections radially extending therefrom.

4. Apparatus for irrigating a wound comprising a fluid source, a flow rate control valve, means adapted to be located proximate the wound for imparting fluid thereto, said fluid imparting means having inlet means and outlet means, means for connecting said source, through said valve, to said inlet means, said connecting means comprising pulsating means for visually indicating the direction and rate of flow of fluid through said connecting means, said indicating means comprising a hollow chamber having an axis and comprising first and second spaced, substantially circular walls and a substantially cylindrical wall, colinearly aligned inlet and outlet ports located at tangentially spaced points along said cylindrical wall of said chamber on opposite sides thereof, an element, means for freely rotatably mounting said element within said chamber, said element comprising an axle and a plurality of blade-like projections radially extending from said axle towards said cylindrical wall, at least one of said projections being shorter than the others and having a peripheral edge spaced from said cylindrical wall, said chamber comprising a substantially transparent portion to permit observation of the rotational movement of said element as fluid flows from said inlet port to said outlet port, and wherein said rotational movement of said element has a pulsating effect due to the presence of said one shorter projection.

5. The apparatus of claim 4, wherein said mounting means comprises end portions of said axle extending laterally beyond the plane of said projections at either side thereof and a recess in each of said circular walls, said recesses being aligned with each other and with said axis, said recesses being adapted to accept the laterally extending end portions of said axle so as to permit said element to freely rotate within said chamber.

6. The apparatus of claim 5, wherein said axle has four or more blade-like projections radially extending therefrom.

7. The apparatus of claim 6, wherein said axle has six blade-like projections radially extending therefrom.

* * * * *